Oct. 9, 1956     G. L. MYERS     2,765,902
SAFETY DEVICE FOR CROP FEEDER
Filed Nov. 17, 1953

INVENTOR.
G. L. MYERS
BY
ATTORNEYS

United States Patent Office 2,765,902
Patented Oct. 9, 1956

2,765,902

SAFETY DEVICE FOR CROP FEEDER

Glenn L. Myers, Ottumwa, Iowa, assignor to Deere Manufacturing Co., Dubuque, Iowa, a corporation of Iowa Application November 17, 1953, Serial No. 392,710

9 Claims. (Cl. 198—223)

This invention relates to a crop feeder and more particularly to a safety release device for preventing damage to the feeder in the event that it should encounter an unyielding obstruction.

Feeders of the character referred to are used in many types of agricultural machines, but in some machines the problem of providing an adequate feeder is somewhat more acute than in others. For example, in an agricultural pickup baler, the feeder operates to move picked up crops into the bale chamber and accordingly the feeder must be timed with the reciprocating plunger, since obviously the feeder and the plunger cannot occupy the same space at the same time. Ordinarily, the timing is such that conflict between the two does not occur. However, it very often happens that the feeder will encounter an obstruction in the form of foreign matter picked up by the machine and in order to prevent excess damage to the feeder, it is fairly conventional to establish some form of releasable device in the feeder drive so that when the obstacle is encountered the device will yield rather than compel the feeder to accept its punishment. Although these release or safety devices are in the main satisfactory, there still remains a problem involving the fact that the feeder drive continues to operate even though the direct connection to the feeder is released. That is to say, in the case of a rotary or crank-type feeder, the rotating part will continue even though the feeder arm or arms are released and because of the pivotal mounting of the arm or arms on the crank or equivalent rotary member, it often occurs that the arm will swing into the bale chamber and into the path of the reciprocating plunger.

Accordingly, it is an important object of the present invention to provide retracting means automatically effective in response to releasing of the safety device to move the feeder to a safe position even though the feeder drive continues. Other objects of the invention include the design of a relatively simple safety device and retractor, the utilization of a shear pin and simple torsion spring as the retractor, and in general the provision of a device that may be readily manufactured and easily maintained in the field.

The foregoing and other important objects and desirable features inherent in and encompassed by the invention will become apparent as a preferred embodiment of the invention is disclosed in detail in the following description and accompanying sheet of drawings, the several figures of which will be described immediately below.

Figure 1:
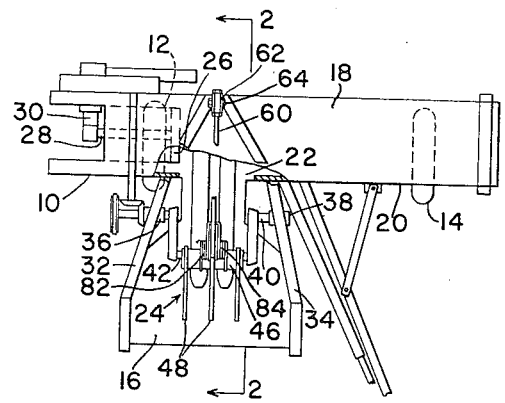
Fig. 1 is a plan view, on a somewhat reduced scale, of a typical agricultural baler embodying the invention in its feeder.

The baler chosen for the purposes of illustration is of a well-recognized commercial type comprising a mobile frame 10 carried on a pair of ground-engaging wheels 12 and 14 for advance over a field of previously harvested and windrowed crops. A forwardly extending pickup mechanism 16 picks up the windrowed crops and delivers them rearwardly to an elongated bale case 18 which is disposed with its length tranverse to the line of advance. The bale case 18 is of rectangular section (Fig. 2) and is made up of a plurality of walls, including an upright front wall 20 in which is provided a feed opening 22 through which crops are transferred from the pickup mechanism 16 to the bale case 18 by feeder means designated generally by the numeral 24. As the crops are fed into the bale chamber, they are formed into successive bales by the operation of a continuously reciprocating plunger 26 driven in any conventional manner by means of a pitman 28 and crankshaft 30.

The arrangement just described is merely representative of several forms that baler components could assume and is described only generally to provide environment for the ensuing description of the significant features of the invention.

The pickup mechanism 16 is defined at opposite sides by forwardly diverging side walls 32 and 34 on which are respectively mounted bearings 36 and 38 for journaling a feeder crankshaft 40. The crankshaft includes, among other things, a crank pin or throw 42 on which is journaled a feeder arm assembly, designated generally by the numeral 44 and shown by itself in Fig. 4. This feeder arm comprises pivotal mounting means in the form of an elongated tubular cross member 46 (Fig. 5) that loosely receives the crank pin 42. Rigidly joined to the tubular portion or member 46 and extending radially therefrom as respects the axis of the crank pin 42 are three feeder arms 48. The tubular cross member 46 has bifurcated arm-mounting means 50 centrally thereof and upstanding therefrom. This means is here shown as having furcations in the form of a pair of parallel arcuate plates 52 and 54 rigidly secured, as by welding at 56, to the central portion of the cross member 46. The structure just described is preferably provided as a subassembly and it is mounted as a unit for swinging or rocking about the crank pin 42, being controlled in normal operation by mechanism to be presently described.

Part of the control means comprises a control arm 58, a control link 60 and support means 62. The support means is rigidly secured at its lower end to the top wall of the bale case 18 and rises therefrom to an appreciable height, having at its upper end a pivot 64 on a transverse axis for effecting connection to one end of the control link 60. The forward or other end of the link 60 is pivotally connected at 66 on a transverse horizontal axis to the first or upper end of the control arm 58. The lower end of the arm 58 is pivotally connected at 68 to the mounting means 50 on a pivot axis parallel to the axis of the crank pin 42, the pivot being effected by passing the pin 68 through the apertured lower or second end of the arm 58 and through alined apertures 70 in the arm-mounting plates 52 and 54. The lower end of the driving arm 58 is received between the plates 52 and 54.

In addition to the force-transmitting connection afforded at 68, the arm 58 is connected to the arm means 50 by safety release means, here in the form of a shear pin 72 passed through the arm 58 and through alined apertures 74 provided in the plates 52 and 54 in radially spaced relation as respects the pin 68.

Figure 4:
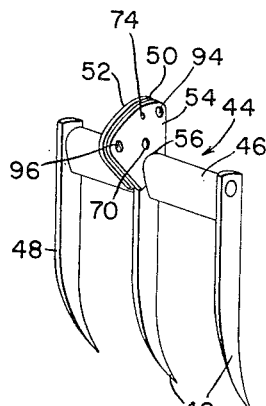
Fig 4 is a perspective view of the feeder arm assembly.
Figure 2:
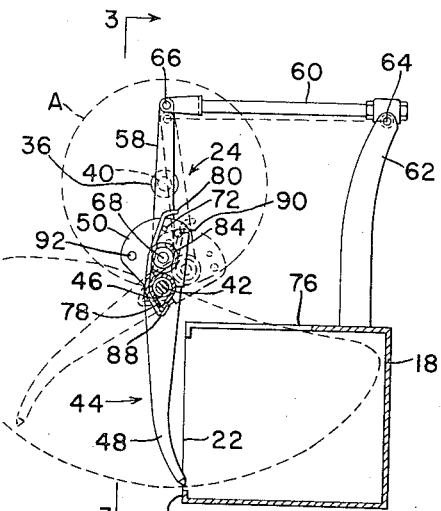
Fig. 2 is a sectional view on a somewhat enlarged scale as seen substantially along the line 2—2 of Fig. 1.

If it is considered that the arm 58 is a rigid or integral part of the feed arm assembly, then it will be clear that during normal operation rotation of the crankshaft 40 in a counterclockwise direction as represented by the dotted circle A in Fig. 4 will produce motion of the free end of each arm 48 in an orbital path as represented by the dotted line B in Fig. 2. To this extent the feeder 24 and its relationship to the bale case 18 are not unconventional. As illustrated in Fig. 2, the orbit or path B in which the feeder arms 48 move enters the bale case 18 through the feed opening 22 and accordingly the feeder 24 must be timed with the plunger 26 so that the two do not normally attempt to occupy the same space at the same time. Hence, in the absence of abnormal conditions, the operation of the baler will be continuous and automatic and will include motion of the feeder means 24 in timed relationship with the plunger 26 as just described, the feeder arms 48 moving generally in a counterclockwise direction, entering the bale case and retracting upwardly therefrom through appropriate slots, such as at 76, in the top wall of the bale case. However, should the feed arms 48 encounter an obstruction that they cannot force into the bale case 18, the safety release device afforded by the shear pin 72 will function to release one of the two force-transmitting connections (68 and 72) between the arm 58 and the feed arm assembly 44. Therefore, the arm 58 will be free to pivot at 68 relative to the feed arm assembly 44 and that assembly is, as previously stated, free to pivot or rock about the crank pin 42, enabling the feed arms 48 to swing forwardly or away from the bale case to the dotted-line position shown in Fig. 2. Because of the pivotal connections just described, the crankshaft 40 can continue to rotate without actually imposing any feeding or driving forces on the feed arm assembly 44.

From the description thus far, it is established that the rotatable crank 40, journaled on the support 36—38 and having the crank pin 42, carries the feed arm by means of the tubular cross member 46, which member is journaled on the crank pin. The feed arms depend from the tubular member generally radially therefrom to free end portions which travel in a certain feeding direction (Fig. 2). The arm 58 is pivotally connected at 68 to the support and further has the connection established by the overload release means 72 so that the overload release means normally nullifies the pivot 68, resulting in a temporary rigid construction as respects the feeder assembly 44 and the arm 58. Upon the occurrence of excessive feeding loads on the feed arms 48, the overload release device or shear pin 72 will release or break, rendering the pivot 68 effective so that the crank can continue to rotate without driving the feed arms 48 in their normal paths. However, as already indicated, the free swinging of the feeder arms 48 about the crank pin 42 is apt to incur damage, because the arms 48 may inadvertently swing into the bale case 18 through the opening 22 while the plunger 26 is on a compression stroke, the net result of which is to save the feeder arms 48 from one kind of damage but to subject them to another. According to the present invention, the second peril is avoided by retractor means operative upon release of the overload release means for causing the feeder arms 48 to pivot in a forward direction and to retain these arms in that direction or position and consequently to prevent entry thereof into the bale case.

Figure 5:
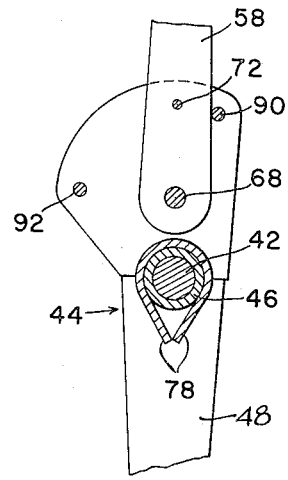
Fig. 5 is a fragmentary view, partly in section, showing the relationship between the feeder arm, the crankshaft, the driving arm and the release device.
Figure 3:
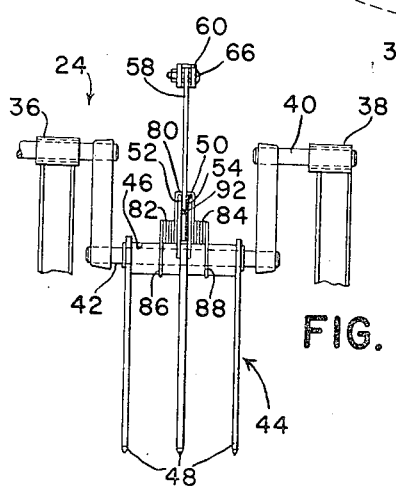
Fig. 3 is a front elevational view of the feeder and portions of its mount, as seen generally along the line 3—3 of Fig. 2.

As best shown in Fig. 5, the tubular member 46 is of peculiar shape, having downwardly and radially projecting integral portions 78 which in effect establish a connecting point in radially spaced relation to the axis of the crank pin 42. The retracting means takes the form of biasing means such as a torsion spring having a central bight or U-shaped portion 80, a pair of coils 82 and 84 and a pair of free hooked ends 86 and 88. The biasing means is installed with the U portion 80 embracing a rear portion of the arm 58 above the shear pin 72 and the hooked legs 86 and 88 engaging the projecting portions 78 on the tubular cross member 46, the coils 82 and 84 being respectively at opposite sides of the plates 52 and 54 (Fig. 3). As shown in Fig. 2, the coils 82 and 84 are coaxial with the pivot 68 but this, like other specific aspects, is not material in the broad sense.

In any event, the spring is preloaded so that it has a tendency to swing the feeder 48 to the dotted-line position of Fig. 2, this tendency being resisted, of course, by the shear pin 72. When, in the course of operation, the feeder arms 48 are subjected to excessive load, the shear pin 72 will break, thus releasing the stored energy in the spring so that the action of the spring is such as to swing the feeder arms 48 as a unit in the direction opposite to the feeding direction. The spring has sufficient strength to hold the retracted feeder arms in this position so that even though the crank 40 continues to rotate, the free ends of the feeder arms cannot enter the bale case opening 22.

As further features of the preferred construction illustrated, the arm-mounting means 50, which as previously stated comprises the plates 52 and 54, has a pair of angularly spaced stop pins 90 and 92 received respectively in alined apertures 94 and 96 in the plates 52. When the arm 58 and feeder arm assembly 44 occupy their normal operating positions relative to each other, the rear edge of the arm 58 abuts the stop pin 90. When the shear pin 72 releases and the feed arm assembly is retracted, as already described, the stop pin 92 will engage the front edge of the arm 58.

Upon release of the shear pin and retraction of the feeder, the feeder will cease to be effective for achieving the delivery of crops into the bale chamber 18 and ultimately the absence of emerging bales will indicate to the operator, unless he has become previously informed, that the machine is not functioning properly. When the machine is stopped and the crankshaft 40 is idle, it is a relatively easy matter to restore the feeder arm assembly 44 to its original position so that a new shear pin 72 can be installed. It is not necessary, of course, that a shear pin 72 be used, for any other form of overload release device can be utilized. Also, the particular type of biasing means used as the retracting mechanism is only representative of other forms of retracting means that could be used in the broad sense.

Various other features of the invention not specifically enumerated herein will undoubtedly occur to those versed in the art, as will many modifications and alterations in the preferred embodiment of the invention illustrated, all of which may be achieved without a departure from the spirit and scope of the invention.

What is claimed is:

1. A feeder of the character described, comprising: a driving member movable in a feeding direction; a feed member; means connecting the feed member to the driving member and including first and second force-transmitting elements interconnecting the two members, said first element providing a permanent connection and including a pivot and said second element including an overload release device spaced from the pivot, said two elements being normally cooperative to connect the feed member to the driving member for movement of the feed member in a feeding path and said overload release means being releasable upon excess feed loads imposed on the feed member to enable the feed member to pivot relative to the drive member on the aforesaid pivot; and yieldable biased means including a torsion spring having a coil portion proximate to the pivot and a pair of oppositely extending legs respectively engaging the members and effective to retract the feed member from the feeding path about said pivot upon release of the overload release means.

2. A feeder of the character described, comprising: a driving member movable in a feeding direction; a feed member; means connecting the feed member to the driving member for movement of the feed member by the driving member in a feeding path and including a first force-transmitting connection supporting the feed member on the driving member for movement of the feed member relative to the driving member into and out of the feeding path and a second force-transmitting connection comprising an overload release device cooperative with the first connection to hold the feed member normally against movement relative to the driving member; and yieldable biasing means including a torsion spring having a coil portion and a pair of oppositely extending legs hooked respectively over the members to be supported by the members and effective to move the feed member out of the feeding path upon release of the overload release means.

3. A feeder of the character described, comprising: a support; a rotatable crank journaled on the support and having a crank pin; a cross member journaled on the crank pin; a feed arm having one end rigid with the cross member and depending generally radially therefrom to a free end; arm-mounting means rigid on and upstanding from the cross member; a control arm pivotally connected at one end to the support and having its other end proximate to the arm-mounting means; pivot means interconnecting the control arm and the arm-mounting means on an axis parallel to that of the crank pin; overload release means interconnecting the control arm and the arm-mounting means for normally nullifying the pivot means and rigidifying the arm-mounting means and the control and feed arms for causing travel of the remote end of the feed arm in a feeding path as the crank rotates, said overload release means being releasable in response to excessive feeding loads imposed on the feeding arm so that the feed arm and arm-mounting means may pivot in unison on the pivot means relative to the control arm; and biasing means connected between the control and feed arms and operative upon release of the overload release means for causing said relative pivoting of the feed arm to occur in only one direction.

4. The invention defined in claim 3, in which: the cross member has a rigid depending portion; and the biasing means is connected to the driving member above the crank pin and to the depending portion below the crank pin.

5. The invention defined in claim 4, in which: the biasing means is a torsion spring having opposite hooked ends hooked respectively to the control arm and to the depending portion.

6. The invention defined in claim 3, in which: the arm-mounting means is bifurcated and receives the control arm between the furcations; and the cross member carries additional feed arms alongside the aforesaid feed arm, one of said feed arms being located generally in the plane between the aforesaid furcations.

7. The invention defined in claim 3, in which: stop means is cooperative between the control arm and the arm-mounting means to limit the aforesaid relative movement of the feed arm upon release of the overload release means.

8. A feeder of the character described, comprising: a support; a rotatable crank journaled on the support and having a crank pin; a control arm having a first end pivotally connected to the support and a second end proximate to the crank pin; a feed arm having a first end pivotally connected to the crank pin and extending radially therefrom substantially as a continuation of the control arm to provide a free second end for engagement with material as the crank rotates; pivot means interconnecting the second end of the control arm and the first end of the feed arm on an axis parallel to and in the vicinity of the crank pin; overload release means interconnecting the control and feed arms and immobilizing the pivot means to normally achieve movement of the two arms as one as the crank rotates so that the free end of the feed arm moves material in a feeding direction, said overload release means being releasable upon overloading of the feed arm to enable the feed arm to move opposite to the feed direction relative to the control arm about the axis of the pivot means; and biased retracting means interconnecting the two arms and biased to move the feed arm in said opposite direction upon release of the overload release means.

9. The invention defined in claim 8, in which: the retracting means comprises a coiled torsion spring positioned adjacent to the crank pin and having oppositely extending legs engaged respectively with the control arm and the feed arm.

References Cited in the file of this patent

UNITED STATES PATENTS

| | | |
|---|---|---|
| 551,302 | Brown et al. | Dec. 10, 1895 |
| 682,514 | Wilson | Sept. 10, 1901 |
| 1,009,719 | Bradley | Nov. 28, 1911 |
| 1,028,404 | Trabue | June 4, 1912 |
| 1,036,467 | Djunkofsky | Aug. 20, 1912 |
| 2,450,082 | Crumb et al. | Sept. 28, 1948 |